United States Patent
Chao et al.

(10) Patent No.: US 7,124,350 B2
(45) Date of Patent: Oct. 17, 2006

(54) WIRELESS COMMUNICATION METHOD AND SYSTEM FOR DETECTING AND CORRECTING TRANSMISSION ERRORS

(75) Inventors: Yi-Ju Chao, Minnetonka, MN (US); Stephen G. Dick, Nesconset, NY (US); James M. Miller, Verona, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 498 days.

(21) Appl. No.: 10/431,089

(22) Filed: May 7, 2003

(65) Prior Publication Data

US 2003/0235162 A1 Dec. 25, 2003

Related U.S. Application Data

(60) Provisional application No. 60/378,610, filed on May 7, 2002.

(51) Int. Cl.
*H03M 13/35* (2006.01)
*H03M 13/03* (2006.01)

(52) U.S. Cl. .................. 714/776; 714/48; 714/712; 370/242

(58) Field of Classification Search ............... 714/700, 714/699, 100, 56, 48, 43, 712, 776; 370/252, 370/242

See application file for complete search history.

(56) References Cited

U.S. PATENT DOCUMENTS 5,778,317 A 7/1998 Kaminsky

| | | | |
|---|---|---|---|
| 6,240,087 B1 | 5/2001 | Cummings et al. |
| 6,374,102 B1 | 4/2002 | Brachman et al. |
| 2001/0056560 A1 | 12/2001 | Khan et al. |
| 2002/0141367 A1 | 10/2002 | Hwang et al. |
| 2003/0039218 A1 | 2/2003 | Kwak et al. |
| 2003/0133408 A1 | 7/2003 | Cheng et al. |

FOREIGN PATENT DOCUMENTS

| | | |
|---|---|---|
| EP | 0797327 | 9/1997 |
| JP | 11088462 | 3/1999 |
| JP | 110888462 | 3/1999 |

OTHER PUBLICATIONS

3GPP TSG-RAN WG1/WG2, "Uplink Channel Structure for HSDPA", Joint Meeting on HSDPA, Sophia Antipolis, France, Apr. 5-6, 2001.

*Primary Examiner*—Albert Decady
*Assistant Examiner*—Dipakkumar Gandhi
(74) *Attorney, Agent, or Firm*—Volpe and Koenig, P.C.

(57) ABSTRACT

A wireless communication method and system for detecting and correcting transmission errors. The system includes at least one wireless transmit/receive unit (WTRU) in communication with a Node B. The Node B sends a transmission signal (e.g., containing a protocol data unit (PDU)) to the WTRU. The WTRU generates a revert message having a first field and a second field to indicate whether the transmission signal was successfully received at the WTRU. The WTRU inserts a negative acknowledgement (NACK) message or positive acknowledgement (ACK) message into the first field and inserts a respective channel quality identifier (CQI) value corresponding to a worst or best possible value of CQI into the second field. The WTRU transmits the revert message to the Node B which compares the contents of the first and second fields. The Node B resends the transmission signal to the WTRU if the contents of the first and second fields are not logically consistent.

10 Claims, 4 Drawing Sheets

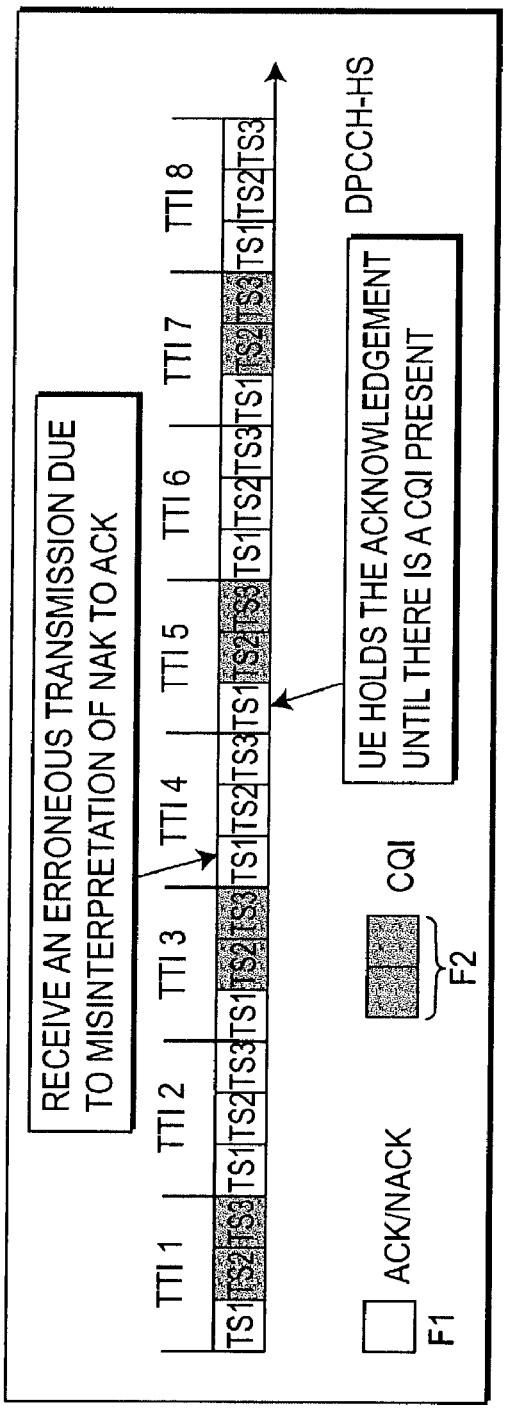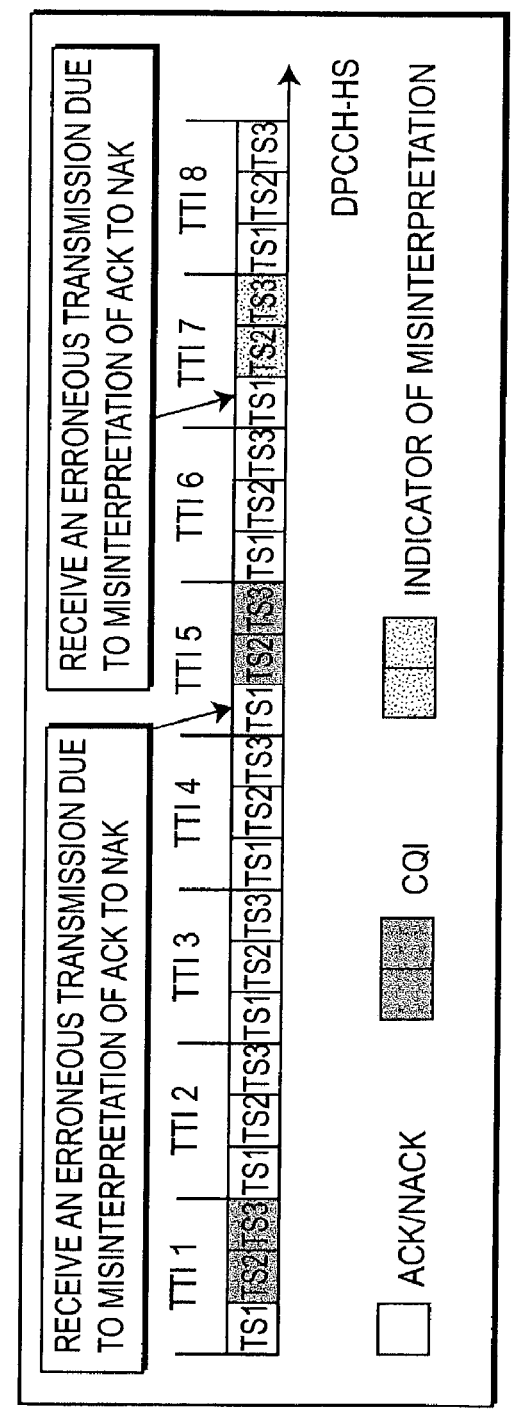

WIRELESS COMMUNICATION METHOD AND SYSTEM FOR DETECTING AND CORRECTING TRANSMISSION ERRORS

CROSS REFERENCE TO RELATED APPLICATION(S)

This application claims priority from U.S. Provisional Application No. 60/378,610, filed on May 7, 2002, which is incorporated by reference as if fully set forth.

FIELD OF INVENTION

The present invention relates to the field of wireless communications. More specifically, the present invention relates to the reduction of transmission errors in a Third Generation (3G) cellular system that uses Hybrid Automatic Repeat Request (H-ARQ) techniques.

BACKGROUND

In 3G cellular systems, for Frequency Division Duplex (FDD) and Time Division Duplex (TDD) there are retransmission mechanisms in the Acknowledgement Mode of the Radio Link Control (RLC) layer to achieve high reliability of end-to-end data transmissions. The RLC layer is a peer entity in both the Radio Network Controller (RNC) and the User Equipment (UE).

A block diagram of the UMTS Terrestrial Radio Access Network (UTRAN) MAC-hs layer architecture is illustrated in FIG. 1, and a block diagram of UE MAC-hs architecture is shown in FIG. 2. The UTRAN MAC-hs 30 shown in FIG. 1 comprises a Transport Format Combination (TFC) selection entity 31, a scheduling device 32, a plurality of H-ARQ processors 33a, 33b and a flow controller 34.

The UE MAC-hs 40 comprises an H-ARQ processor 41. As will be explained with reference to both FIGS. 1 and 2, the H-ARQ processors 33a, 33b in the UTRAN MAC-hs 30 and the H-ARQ processor 41 in the UE MAC-hs 40 work together to process blocks of data.

The H-ARQ processors 33a, 33b in the UTRAN MAC-hs 30 handle all of the tasks that are required for H-ARQ to generate transmissions and retransmissions for any transmission that is in error. The H-ARQ processor 41 in the UE MAC-hs 40 is responsible for generating a positive acknowledgement (ACK) to indicate a successful transmission, and for generating a negative acknowledgement (NACK) to indicate a failed transmission. The H-ARQ processors 33a, 33b and 41 process sequential data streams for each user data flow.

As will be described in further detail hereinafter, blocks of data (or protocol data units (PDUs)) received on each user data flow are sequentially assigned to H-ARQ processors 33a, 33b. For purposes of describing the invention, it is assumed that one PDU equals one data block, although this is not necessarily the case. Each H-ARQ processor 33a, 33b initiates a transmission, and in the case of an error, the H-ARQ processor 41 requests a retransmission. On subsequent transmissions, the modulation and coding rate may be changed in order to ensure a successful transmission. The data block to be retransmitted and any new transmissions to the UE are forwarded to the scheduling device 32.

The scheduling device 32, coupled between the H-ARQ processors 33a, 33b and the TFC selector 31, functions as radio resource manager and determines transmission latency in order to support the required QoS. Based on the outputs of the H-ARQ processors 33a, 33b and the priority of a new data block being transmitted, the scheduling device 32 forwards the data block to the TFC selection entity 31.

The TFC selection entity 31, coupled to the scheduling device 32, receives the data block to be transmitted and selects an appropriate dynamic transport format for the data block to be transmitted. With respect to H-ARQ transmissions and retransmissions, the TFC selection entity 31 determines modulation and coding.

It is highly desirable for the retransmitted data blocks to arrive at the RLC entity of the receiving side (i.e., the UE) as soon as possible for several reasons. First, the missed data block will prevent subsequent data blocks from being forwarded to higher layers, due to the requirement of in-sequence delivery. Second, the buffer of the UE needs to be sized large enough to accommodate the latency of retransmissions while still maintaining effective data rates. The longer the latency is, the larger the UE buffer size has to be to allow for the UE to buffer both the data blocks that are held up and continuous data receptions until the correct sequence data block is forwarded to higher layers. The larger buffer size results in increased hardware costs for UEs. This is very undesirable.

Referring to FIG. 3, a simplified flow diagram of the data flow between a Node B (shown at the bottom of FIG. 3) and a UE (shown at the top of FIG. 3) is shown. PDUs from higher level processing are scheduled and may be multiplexed into one data block. A data block can only contain PDUs of higher layers of the same priority. A unique Transmission Sequence Number (TSN) is assigned to each data block by a scheduler. The higher layers may provide a plurality of streams of different priorities of PDUs, each priority having a sequence of TSNs. The scheduler then dispatches the data blocks to a plurality of H-ARQ processors $P1_B$–$P5_B$.

Each H-ARQ processor $P1_B$–$P5_B$ is responsible for processing a single data block at a time. For example, as shown in FIG. 3, the Priority 1 PDUs comprise a sequence illustrated as $B1_1$–$B1_N$. Likewise, the Priority 2 PDUs are sequenced from $B2_1$–$B2_N$ and the Priority 3 PDUs are sequenced from $B3_1$–$B3_N$. These PDUs are scheduled (and may be multiplexed) and affixed a TSN by the scheduler. After a data block is scheduled to be processed by a particular processor $P1_B$–$P5_B$, each data block is associated with a processor identifier, which identifies the processor $P1_B$–$P5_B$ that processes the data block.

The data blocks are then input into the scheduled Node B H-ARQ processors $P1_B$–$P5_B$ which receive and process each data block. Each Node B H-ARQ processor $P1_B$–$P5_B$ corresponds to an H-ARQ processor $P1_{UE}$–$P5_{UE}$ within the UE. Accordingly, the first H-ARQ processor $P1_B$ in the Node B communicates with the first H-ARQ processor $P1_{UE}$ in the UE. Likewise, the second H-ARQ processor $P2_B$ in the Node B communicates with the second H-ARQ processor $P2_{UE}$ in the UE, and so on for the remaining H-ARQ processors $P3_B$–$P5_B$ in the Node B and their counterpart H-ARQ processors $P3_{UE}$–$P5_{UE}$ respectively within the UE. The H-ARQ processes are timely multiplexed onto the air interface.

For example, taking the first pair of communicating H-ARQ processors $P1_B$ and $P1_{UE}$, the H-ARQ processor $P1_B$ processes a data block, for example $B1_1$, and forwards it for multiplexing and transmitting it over the air interface. When this data block $B1_1$ is received by the first H-ARQ processor $P1_{UE}$, the processor $P1_{UE}$ determines whether or not it was received without error. If the data block $B1_1$ was received without error, the first H-ARQ processor $P1_{UE}$ transmits an ACK to indicate to the transmitting H-ARQ processor $P1_B$ that it has been successfully received. On the contrary, if there is an error in the received data block B1$_1$, the receiving H-ARQ processor P1$_{UE}$ transmits a NACK to the transmitting H-ARQ processor P1$_B$. This process continues until the transmitting processor P1$_B$ receives an ACK for the data block B1$_1$. Once an ACK is received, that processor P1$_B$ is "released" for processing another data block. The scheduler will assign the processor P1$_B$ another data block if available.

As graphically illustrated in FIG. 3, the scheduler knows of the release of the processor P1$_B$ by receiving the ACK/NACK, or may use some other signaling scheme that is well known in the art.

Once the receiving H-ARQ processors P1$_{UE}$–P5$_{UE}$ process each data block, the data blocks are forwarded to the reordering buffers R$_1$, R$_2$, R$_3$ based on their priority; one reordering buffer for each priority level of data. For example, Priority 1 data blocks B1$_1$–B1$_N$ will be received and reordered in the Priority 1 reordering buffer R$_1$; Priority 2 data blocks B2$_1$–B2$_N$ will be received and reordered in the Priority 2 reordering buffer R$_2$; and the Priority 3 data blocks B3$_1$-B3$_N$ will be received and reordered by the Priority 3 reordering buffer R$_3$. Due to the pre-processing of the data blocks by the receiving H-ARQ processors P1$_{UE}$–P$^5$UE and the ACK/NACK acknowledgement procedure, the data blocks are often received in an order that is not sequential with respect to their TSNs. The reordering buffers R$_1$–R$_3$ receive the out-of sequence data blocks and attempt to reorder the data blocks in a sequential manner prior to forwarding onto the RLC layer. For example, the Priority 1 reordering buffer R$_1$ receives and reorders the first four Priority 1 data blocks B1$_1$–B1$_4$. As the data blocks are received and reordered, they will be passed to the RLC layer.

On the receiving side, the UE MAC-hs, (which has been graphically illustrated as MAC-hs control), reads the H-ARQ processor ID, whether it is sent on a control channel such as the HS-SCCH or whether the data block has been tagged, to determine which H-ARQ processor P1$_{UE}$–P5$_{UE}$ has been used. If the UE receives another data block to be processed by the same H-ARQ processor P1$_{UE}$–P5$_{UE}$, the UE knows that that particular H-ARQ processor P1$_{UE}$–P5$_{UE}$ has been released regardless of whether or not the previous data block processed by that H-ARQ processor P1$_{UE}$–P5$_{UE}$ has been successfully received or not.

Although, the H-ARQ process provides a mechanism wherein transmissions that are received in error are indicated to the transmitter, and wherein the retransmission of that block is combined in the receiver with previous transmissions to achieve reduced block error rates, for the combining process to work correctly in the receiver the same PDU must be applied in retransmissions as for the initial transmission. During each Transmission Time Interval (TTI), one H-ARQ process may service one data block. The initial transmission and retransmissions of a particular data block are serviced by the same H-ARQ processor.

As aforementioned, the receiving side (the UE) uses ACK or NACK to inform the H-ARQ process of the transmitting side (the Node B) whether a transmission is successful, where ACK indicates success and NACK indicates failure. One ACK/NACK corresponds to one PDU, which is the unit transmitted every TTI. The ACK/NACK is represented by one bit carried on the uplink Dedicated Physical Control Channel—High Speed (DPCCH-HS).

However, a significant problem with this prior art scheme is that a NACK from the UE could be misinterpreted as an ACK by the Node B because the transmission occurs in a fading environment. Due to the nature of radio propagation, this type of error cannot be totally eliminated. For such misinterpretations, there is currently no mechanism for the Node B to be aware of it and the UE will not receive a retransmission of the erroneously received PDU. In this prior art scheme, the failed transmission will not be detected until a higher layer message (i.e. Layer 2) is sent from the UE to the Node B.

The biggest disadvantage of relying on the higher layers to initiate retransmission of a missed PDU is the latency of transmission, since the round-trip delay of the process of retransmission is significantly longer than the timescale of the original transmissions. A Layer 2 message sent from the UE to the Node B to notify the Node B of the failed transmissions will occur only after a significant delay, on the order of 100 milliseconds or more.

In order to attempt to overcome these prior art disadvantages, it has been suggested that the UE should signal to the Node B on the DPCCH-HS when the UE detects a misinterpretation of NACK to ACK. This scheme replaces the simple binary (ACK/NACK) decision by a three (3) state decision (ACK/NACK/Revert). However, the addition of the third state (Revert) reduces the reliability of the processing at the Node B and is, therefore, undesirable.

SUMMARY

The present invention advances the art by providing a system and procedure that do not degrade the reliability of a message that confirms or acknowledges that data has been successfully received at the receiving side of a wireless communication system. A mechanism is provided on the transmitting side (the Wireless Transmit/Receive Unit (WTRU)) of a wireless communication system to indicate the existence of an unusual situation to the receiving side (the Node B) of a wireless communication (e.g., cellular) system. Such an indication may be used, for example, to mitigate misinterpretation of the acknowledge message. Several methods are proposed using different repetition periods for a Channel Quality Identifier (CQI), which is used by the WTRU to feed back channel quality indicators on a periodic basis.

In one preferred embodiment, transmission errors that occur in a wireless communication system are detected and corrected. A transmission signal containing information (e.g., a PDU) is sent from a first destination (e.g., the Node B) to a second destination (e.g., the WTRU). A Revert Message (i.e., report) having a first field and a second field is generated to indicate whether the transmission signal was successfully received at the second destination. An acknowledgment message (ACK or NACK) is inserted into the first field, and a channel quality identifier (CQI) value respectively corresponding to a worst or best possible value of CQI is inserted into the second field. The WTRU then transmits the Revert Message to the Node B. The Node B compares the content of the first field to the contents of the second field. Corrective action is taken if the contents of the first and second fields of the Revert Message are not logically consistent, whereby the transmission signal is resent from the Node B to the WTRU.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

Figure 1:
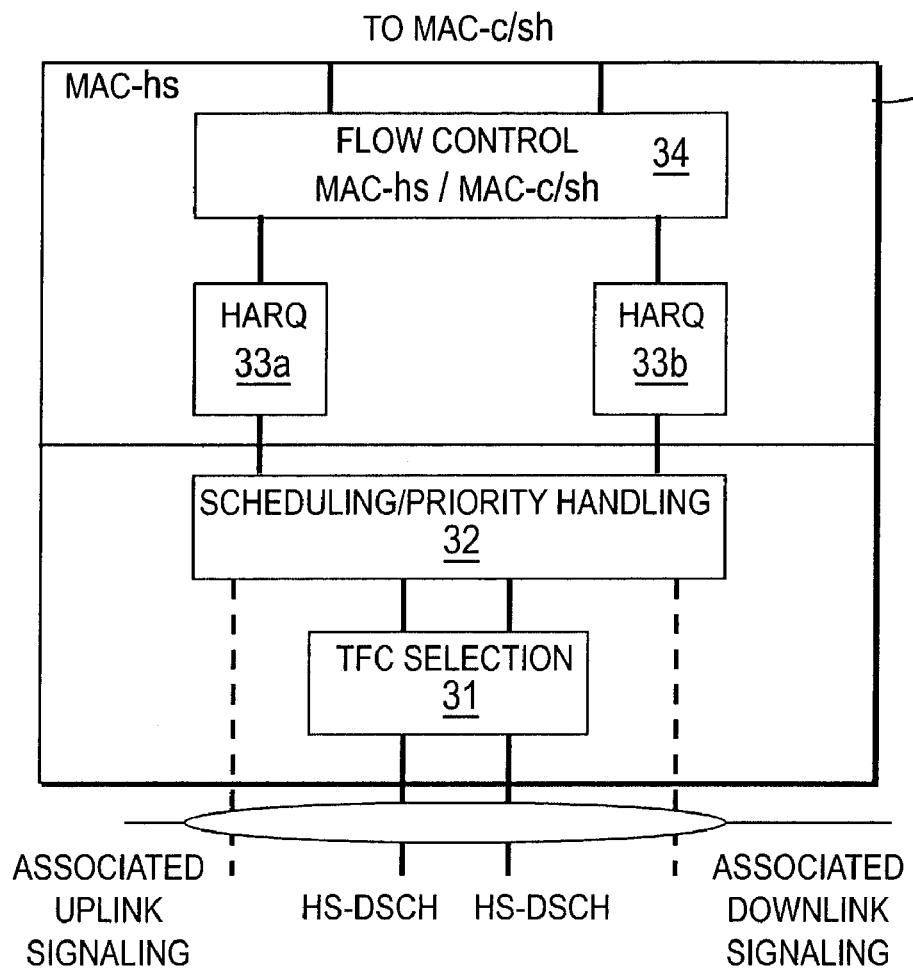
FIG. 1 is a prior art UTRAN MAC-hs.
Figure 2:
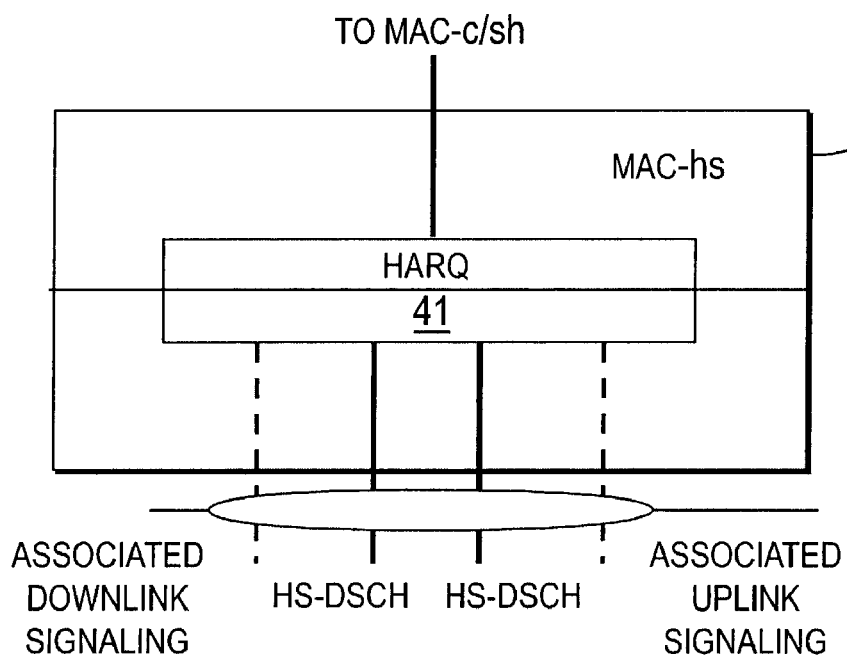
FIG. 2 is a prior art UE MAC-hs.
Figure 3:
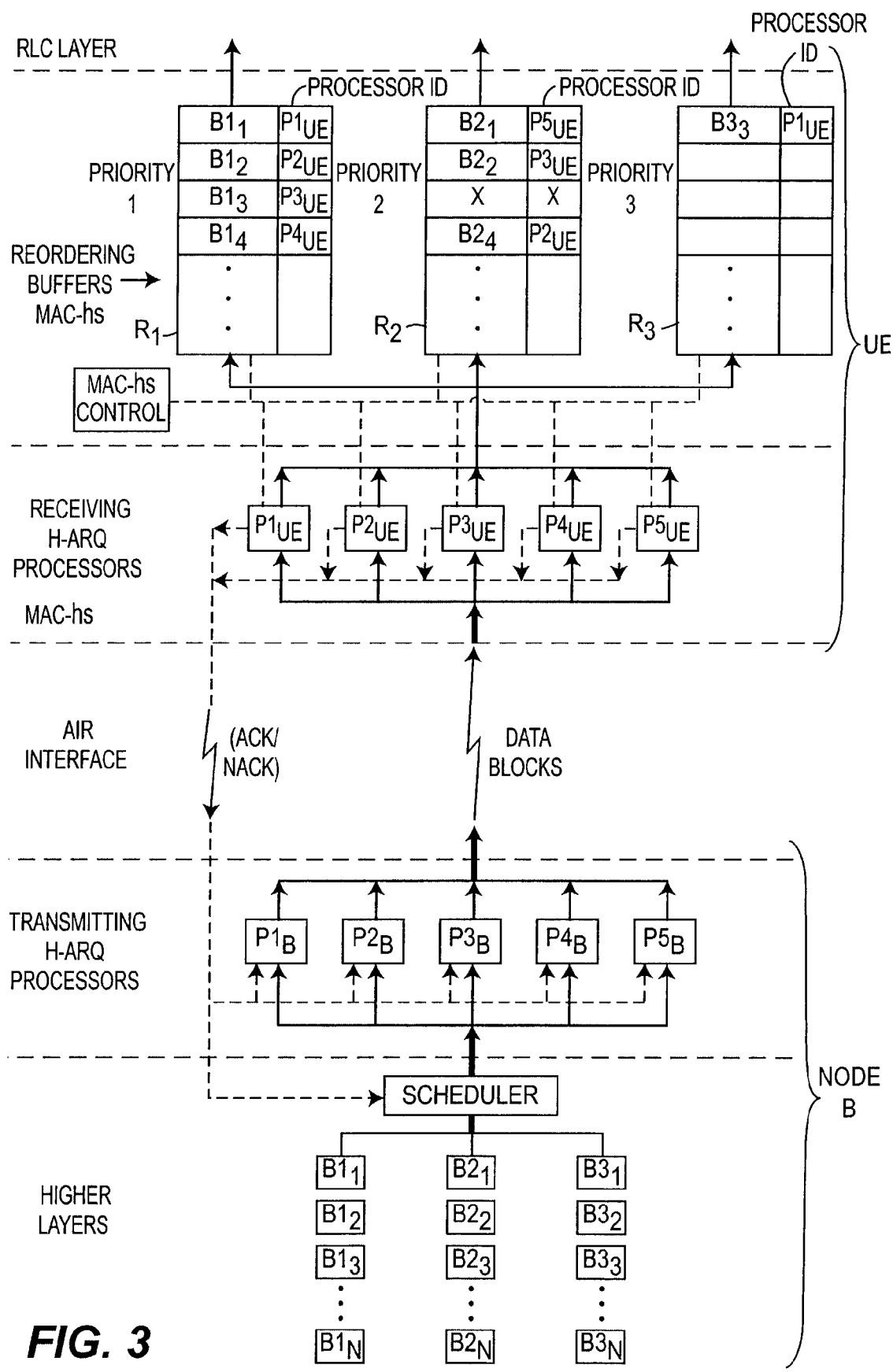
FIG. 3 is a simplified flow diagram of the data flow between a Node B and a UE.

The present invention will be described with reference to the drawing figures wherein like numerals represent like elements throughout. Additionally, although the invention will be described with reference to the scenario of the H-ARQ process wherein a WTRU signals a special Revert Message to a Node B via a DPCCH-HS when the WTRU detects a misinterpretation of NACK to ACK, it should be recognized by those of skill in the art that the description is an example and the present invention is not limited to an H-ARQ application.

The present invention identifies (usually on an occasional basis) a need to send a Revert Message. In one preferred embodiment, the WTRU creates the Revert Message by inserting an ACK message into an ACK/NACK field of the Revert Message structure, and inserting a CQI value corresponding to a lowest (worst) possible value of CQI into a CQI field of the Revert Message structure. Alternatively, the WTRU creates the Revert Message by inserting a NACK message into the ACK/NACK field and a CQI value corresponding to a highest (best) possible value of CQI into the CQI field.

Figure 4:
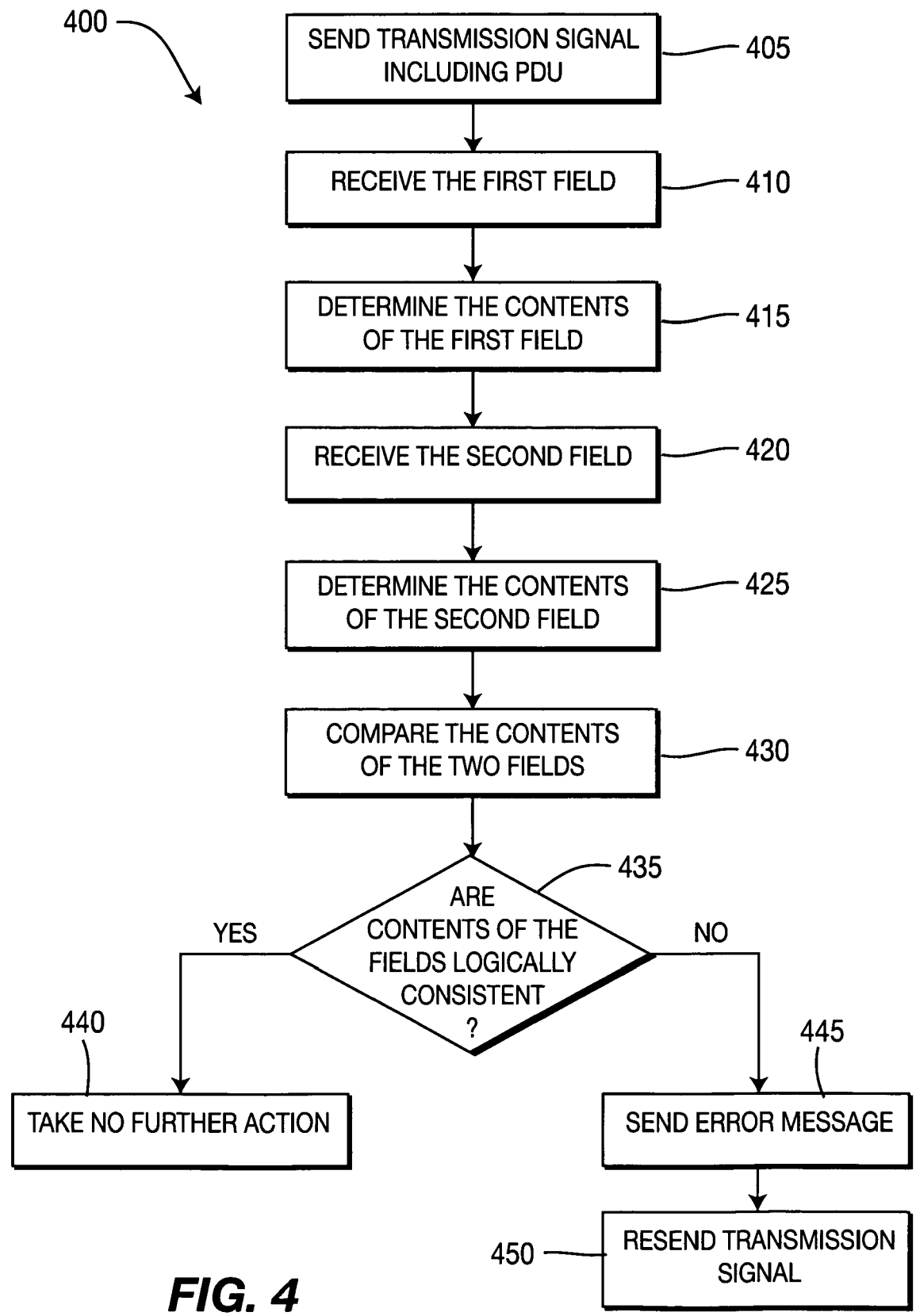
FIG. 4 is a flow diagram of a method in accordance with the present invention for detecting logically inconsistent fields.

FIG. 4 is a flow diagram showing the steps of a method 400 for detecting errors and correcting transmission errors in accordance with a preferred embodiment of the present invention. In step 405, a transmission signal including information (i.e., a PDU) is sent from a first destination (e.g., the Node B) to a second destination (e.g., the WTRU). In step 410, the side transmitting the high speed data and receiving the ACKs/NACKs (the first destination) receives a first field (e.g., containing ACK or NACK) from the side transmitting the ACK/NACK messaging (the second destination). In step 415, the contents of the first field of the Revert Message are determined at the first destination. In step 420, the first destination then receives a second field (e.g., containing a low (worst) or high (best) CQI value) from the second destination (the side transmitting the ACK/NACK messaging). In step 425, the contents of the second field of the Revert Message are determined at the first destination. In step 430, the contents of the two fields are then compared at the first destination. In step 435, it is determined whether the contents of the two fields are logically consistent. If so, no further action is taken (step 440). However, if the two fields are not logically consistent, an error message is generated (step 445). Finally, in step 450, the transmission signal is resent from the first destination to the second destination.

This error message may take any form. In the context of the H-ARQ process, when the WTRU signals the Revert Message to the Node B, the Node B would then retransmit a PDU in response to the error signal. It is important to note that when the PDU was originally transmitted, it was previously believed that the PDU had been received correctly, until receipt of the Revert Message indicated otherwise.

In the scheme as set forth by the preferred embodiment, the WTRU essentially signals the misinterpretation of an ACK to a NACK by signaling a Revert Message including an ACK in the ACK/NACK field along with the lowest (worst) possible CQI value in the CQI field. This is highly improbable because normally an ACK is associated with a high CQI value and thus is classified as a logically inconsistent combination, causing an error signal to be generated. A PDU previously believed to have been received is retransmitted in response to the error signal.

Alternatively, the WTRU essentially signals the misinterpretation of an ACK to a NACK by signaling a Revert Message including a NACK in the ACKlNACK field along with the highest (best) possible CQI value in the CQI field. This is also highly improbable because normally a NACK is associated with a low CQI value and thus is classified as a logically inconsistent combination.

In another alternative embodiment, one of the entries in the CQI field is used to signal the misinterpretation. In this case, the CQI field is restricted to support one less allowable value. For example, if the CQI field is five bits, it can normally support up to thirty-two possible values for CQI. Using this approach, the CQI field can only support thirty-one possible values. The $32^{nd}$ value is sent only in situations where the WTRU needs to signal a Revert Message. Thus, this reserved value is used as a revert flag and is combined with the NACK or ACK to create the unique Revert Message. Alternatively, for example, the $32^{nd}$ value is reserved for providing an indication of an unusual instance without the need to combine the NACK/ACK message. However, this alternative provides a less reliable indication.

Figure 5:
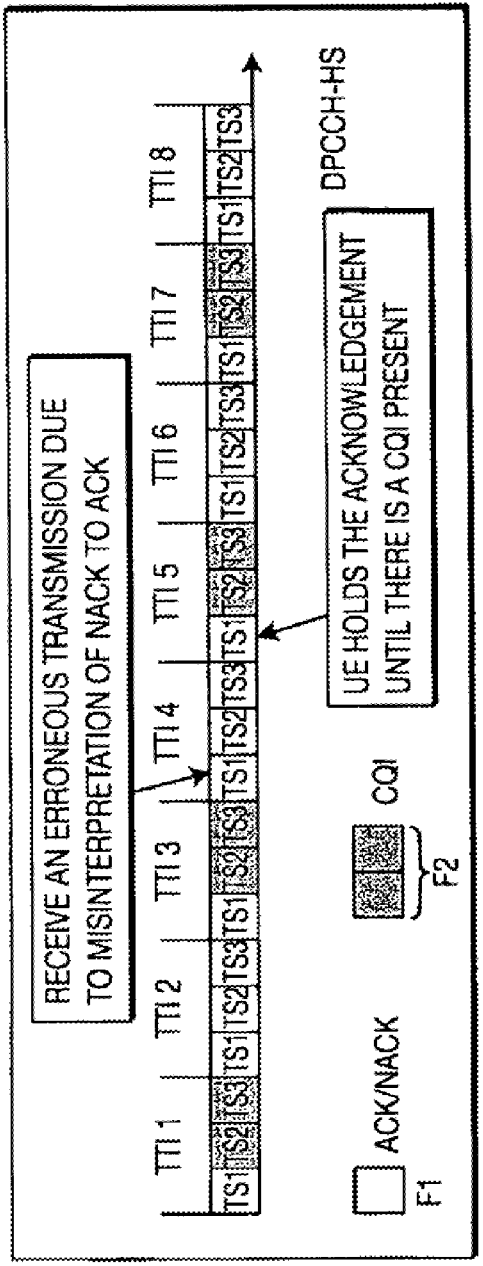
FIG. 5 is the DPCCH-HS channel structure with signaling misinterpretation of ACK/NACK of the present invention.

An example of utilizing the method 400 of FIG. 4 on a DPCCH-HS structure is shown in FIG. 5. The DPCCH-HS structure includes a plurality of TTIs, (TTI1, TTI2, TTI3, etc.), each of which comprises three (3) timeslots TS1, TS2, TS3. There are two fields F1, F2 in the uplink DPCCH-HS. The first field F1, which comprises the first timeslot TS1, is used for ACK/NACK messaging. When there is a transmission of a PDU to the WTRU, the WTRU has to ACK or NACK the transmission, depending upon whether or not the transmission was successful. The ACKlNACK messaging contains one (1) bit of information and is transmitted in the single timeslot TS1.

The second field F2, which comprises the second and third timeslots TS2, TS3, is used for messaging of the channel quality indicator (CQI). The ACK/NACK field F1 and the CQI field F2 are required to operate in time-synchronization within a two (2) millisecond (3 timeslot) interval. While it is important for the CQI field F2 to be reliably decoded by the Node B, it is even more important for the ACK/NACK field F1 to be correctly interpreted. Therefore, to ensure a highly reliable ACK/NACK, a full timeslot is allocated to support this one-bit field. The remaining two time slots are allocated to support a five bit CQI.

The system operation requires that the CQI is used by the WTRU to periodically feedback the channel quality to the Node B. The repetition period of the feedback is preconfigured and known by both the Node B and the WTRU. The repetition period ranges from one (1) TTI to eighty (80) TTIs or more. The CQI contains 5 bits for information and is transmitted in the two timeslots TS2, TS3.

The example channel structure of the DPCCH-HS shown in FIG. 5 assumes that the CQI repetition period is two (2) TTI, (i.e. every other TTI). After receiving an erroneous transmission due to misinterpretation of NACK to ACK, the WTRU coordinates the acknowledgement with the CQI transmission. The WTRU sends a NACK along with either the best channel quality or a spare field to signal the misinterpretation. The NACK and CQI can be in the same TTI or in nearby TTIs based upon the scheduling/repetition of both. In this manner, the Node B will receive both of the messages, (i.e., the NACK message and the positive CQI message), and will determine that a retransmission is necessary.

Figure 6:
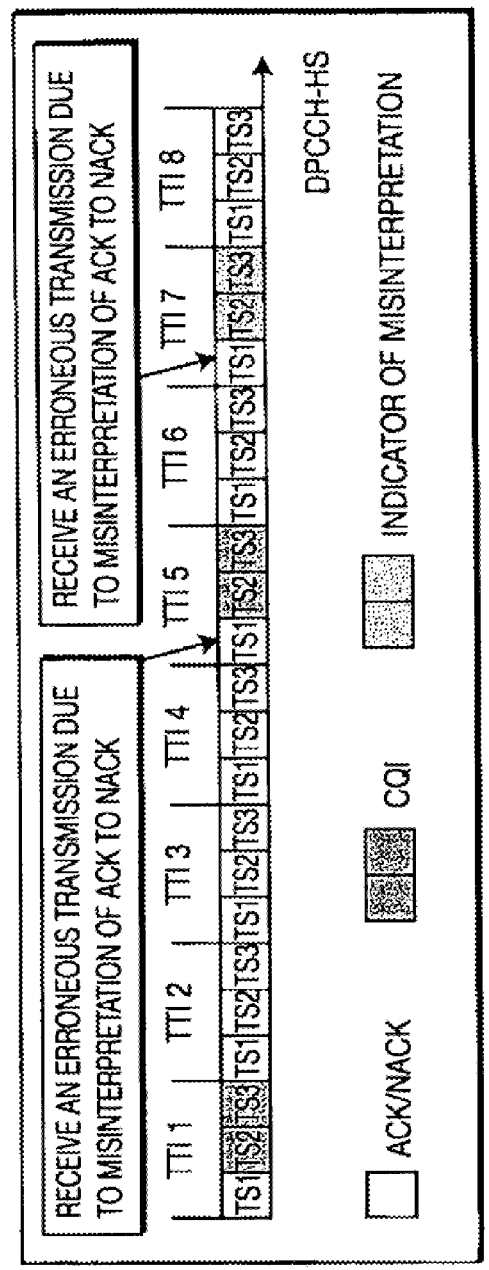
FIG. 6 illustrates DPCCH-HS channel structure with immediate signaling misinterpretation of ACK/NACK of the present invention.

Alternatively, as shown in FIG. 6, in order to enable immediate feedback after detecting a misinterpretation of NACK to ACK, the WTRU can insert a field that indicates the misinterpretation in the next TTI. For the example, as shown in FIG. 6, the CQI is present every 4 TTIs. After receiving an erroneous transmission due to misinterpretation of NACK to ACK, the WTRU immediately acknowledges with a NACK and a bit string. The bit string can either appear in the CQI or is inserted in empty timeslots. Within the TTI, the NACK is transmitted in the first timeslot and the bit stream is transmitted in the second and the third timeslots. To enable still transmit when a CQI is present, the WTRU may use the same bit string as either that representing the best possible channel quality or that representing a spare field of the CQI. However, this method requires the Node B to be able to always receive information from the DPCCH-HS.

Those of skill in the art would recognize that the present invention may be applied to any communication system that incorporates H-ARQ (with an ACK/NACK field) and measures channel quality.

Additionally, the present invention is not limited to the H-ARQ application. The invention may be applied to any two-way communication system in which there are combinations of the two (or more) fields, where it is logically inconsistent for the contents of a first field to occur at the same time as the contents of a second field. The invention may be applied to any two-way communication system in which there is a need for the receiving side to send a special warning message on rare occasions, and where there is a motivation to avoid wasting a bit position in the message to support this occurrence.

In the case where the detection of a logically inconsistent combination, (i.e., the "impossible combination") may be assigned a special meaning, the sending entity replaces the actual (originally intended) contents of the individual fields with the special values that, in combination, are determined to signify the special event. As in the aforementioned H-ARQ application, the ACK/NACK field and the CQI field are filled with logically inconsistent values to signal something that is not directly related to the main purpose of the ACK/NACK or CQI fields.

While the present invention has been described in terms of the preferred embodiment, other variations which are within the scope of the invention as outlined in the claims below will be apparent to those skilled in the art.

What is claimed is:

1. A method for detecting and correcting transmission errors in a wireless communication system, the method comprising:
   (a) sending a transmission signal to a destination;
   (b) generating a Revert Message to indicate whether the transmission signal was successfully received at the destination, the Revert Message having a first field and a second field;
   (c) inserting a negative acknowledgement (NACK) message into the first field;
   (d) inserting a channel quality identifier (CQI) value into the second field;
   (e) transmitting the Revert Message;
   (f) generating an error message in response to receiving the transmitted Revert Message, if the CQL value is set to a best possible value which is not logically consistent with the NACK message.

2. The method of claim 1 further comprising:
   (g) resending the transmission signal to the destination in response to the error message.

3. A method for detecting and correcting transmission errors in a wireless communication system, the method comprising:
   (a) sending a transmission signal to a destination;
   (b) generating a Revert Message to indicate whether the transmission signal was successfully received at the destination, the Revert Message having a first field and a second field;
   (c) inserting a positive acknowledgement (ACK) message into the first field;
   (d) inserting a channel quality identifier (CQI) value into the second field;
   (e) transmitting the Revert Message; and
   (f) generating an error message in response to receiving the transmitted Revert Message, if the CQI value is set to a worst possible value which is not logically consistent with the ACK message.

4. The method of claim 3 further comprising:
   (g) resending the transmission signal to the destination in response to the error message.

5. A wireless communication system for detecting and correcting transmission errors, the system comprising:
   (a) means for sending a transmission signal to a destination;
   (b) means for generating a Revert Message to indicate whether the transmission signal was successfully received at the destination, the Revert Message having a first field and a second field;
   (c) means for inserting a negative acknowledgement (NACK) message into the first field;
   (d) means for inserting a channel quality identifier (CQI) value into the second field;
   (e) means for transmitting the Revert Message; and
   (f) means for generating an error message in response to receiving the transmitted Revert Message, if the CQI value is set to a best possible value which is not logically consistent with the NACK message.

6. The system of claim 5 further comprising:
   (g) means for resending the transmission signal to the destination in response to the error signal.

7. A wireless communication system for detecting and correcting transmission errors, the system comprising:
   (a) means for sending a transmission signal to a destination;
   (b) means for generating a Revert Message to indicate whether the transmission signal was successfully received at the destination, the Revert Message having a first field and a second field;
   (c) means for inserting a positive acknowledgement (ACK) message into the first field;
   (d) means for inserting a channel quality identifier (CQI) value into the second field;
   (e) means for transmitting the Revert Message; and
   (f) means for generating an error message in response to receiving the transmitted Revert Message, if the CQI value is set to a worst possible value which is not logically consistent with the ACK message.

8. The system of claim 7 further comprising:
(g) means for resending the transmission signal to the destination in response to the error signal.

9. A wireless communication system for detecting and correcting transmission errors, the system comprising:
(a) a Node B; and
(b) at least one Wireless Transmit/Receive Unit (WTRU) in communication with the Node B, wherein:
  (i) the Node B sends a transmission signal to the WTRU;
  (ii) the WTRU generates a Revert Message to indicate whether the transmission signal was successfully received at the WTRU, the Revert Message having a first field and a second field;
  (iii) the WTRU inserts a negative acknowledgement (NACK) message into the first field;
  (iv) the WTRU inserts a channel quality identifier (CQI) value into the second field;
  (v) the WTRU transmits the Revert Message to the Node B;
  (vi) the Node B compares the contents of the first field to the contents of the second field; and
  (vii) the Node B resends the transmission signal to the WTRU, if the CQI value is set to a best possible value which is not logically consistent with the NACK message.

10. A wireless communication system for detecting and correcting transmission errors, the system comprising:
(a) a Node B; and
(b) at least one Wireless Transmit/Receive Unit (WTRU) in communication with the Node B, wherein:
  (i) the Node B sends a transmission signal to the WTRU;
  (ii) the WTRU generates a Revert Message to indicate whether the transmission signal was successfully received at the WTRU, the Revert Message having a first field and a second field;
  (iii) the WTRU inserts a positive acknowledgement (ACK) message into the first field;
  (iv) the WTRU inserts a channel quality identifier (CQI) value into the second field;
  (v) the WTRU transmits the Revert Message to the Node B;
  (vi) the Node B compares the contents of the first field to the contents of the second field; and
  (vii) the Node B resends the transmission signal to the WTRU if the CQI value is set to a worst possible value which is not logically consistent with the ACK message.

* * * * *

UNITED STATES PATENT AND TRADEMARK OFFICE
CERTIFICATE OF CORRECTION

PATENT NO. : 7,124,350 B2
APPLICATION NO. : 10/431089
DATED : October 17, 2006
INVENTOR(S) : Chao et al.

It is certified that error appears in the above-identified patent and that said Letters Patent is hereby corrected as shown below:

At column 6, line 41, before the word "messaging", delete "ACKINACK" and insert therefor --ACK/NACK--.

At claim 1, column 8, line 3, after the words "if the", delete "CQL" and insert therefor --CQI--.

Signed and Sealed this

Third Day of July, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,124,350 B2 |
| APPLICATION NO. | : 10/431089 |
| DATED | : October 17, 2006 |
| INVENTOR(S) | : Chao et al. |

It is certified that error appears in the above-identified patent and that said Letters Patent is hereby corrected as shown below:

ON THE TITLE PAGE

Item (56), U.S. PATENT DOCUMENTS, page 1, right column, delete line 5, and insert therefor --2003/0039218 A1 2/2003 Kwak--.

Item (56), FOREIGN PATENT DOCUMENTS, page 1, right column, delete line 3.

At FIG. 5, the top block, second line, before the words "TO ACK", delete "NAK" and insert therefor --NACK--.

At FIG. 6, the left top block, second line, after the words "ACK TO", delete "NAK" and insert therefor --NACK--.

At FIG. 6, the top right block, second line, after the words "ACK TO", delete "NAK" and insert therefor --NACK--.

At column 6, line 41, before the word "messaging", delete "ACKINACK" and insert therefor --ACK/NACK--.

At claim 1, column 8, line 3, after the words "if the", delete "CQL" and insert therefor --CQI--.

Signed and Sealed this

Seventeenth Day of June, 2008

JON W. DUDAS
*Director of the United States Patent and Trademark Office*